United States Patent [19]

Martin

[11] 4,064,299
[45] Dec. 20, 1977

[54] ANTI-FRICTION COMPOSITE WITH METAL BACKING OF RIGID PRONGS AND LUBRICANT OVERLAY

[75] Inventor: Ronald T. Martin, Kent, Wash.

[73] Assignee: Formac International, Inc., Seattle, Wash.

[21] Appl. No.: 618,946

[22] Filed: Oct. 2, 1975

[51] Int. Cl.$^2$ .............................................. B32B 3/06
[52] U.S. Cl. .................................... 428/102; 428/126; 428/134; 428/141; 428/194; 428/460; 428/461; 428/463; 428/414; 428/465; 428/506; 100/93 R; 100/151; 144/281 B; 156/196
[58] Field of Search ............... 428/414, 506, 463, 465, 428/126, 134, 141, 194, 102, 461, 460; 100/93

[56] References Cited

U.S. PATENT DOCUMENTS

| | | | |
|---|---|---|---|
| 2,168,013 | 8/1939 | Winch | 428/194 X |
| 2,918,307 | 12/1959 | Cole et al. | 280/166 X |
| 3,024,147 | 3/1962 | Brooks et al. | 428/134 |
| 3,215,065 | 11/1965 | Malarkey, Jr. | 144/281 X |
| 3,376,183 | 4/1968 | Flynn et al. | 428/461 X |
| 3,899,805 | 8/1975 | McMillan | 428/141 X |

OTHER PUBLICATIONS

J. F. Lowe, "Warp-wise Wire Weave etc.," Design News, Sept. 3, 1973, p. 95.

Primary Examiner—P. C. Ives
Attorney, Agent, or Firm—Christensen, O'Connor, Garrison & Havelka

[57] ABSTRACT

Disclosed are heat-transmitting, anti-friction composites useful for example to reduce sliding friction between the stationary platens and moving belts of continuous hot presses used in the manufacture of consolidated board-like products such as fiberboard. In the disclosed embodiment, the composite comprises a brass sheet perforated in such a manner as to form a multiplicity of rigid prongs projecting transversely from one of its faces. An overlay sheet comprised of polytetrafluoroethylene or other solid lubricant is impaled on the prongs and adhesively bonded to the face of the brass sheet from which the prongs project. The prongs serve to inhibit the tendency of the overlay sheet to undergo plastic flow when subjected to stresses such as are caused by a belt sliding over it. The prongs also serve as paths for efficiently conducting heat through the overlay sheet.

30 Claims, 2 Drawing Figures

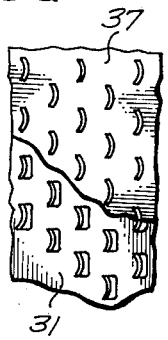
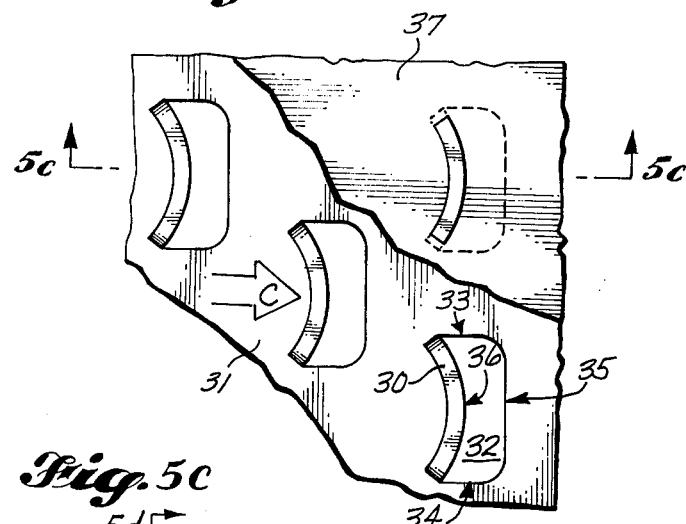
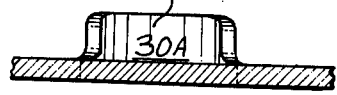
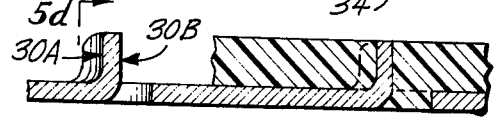
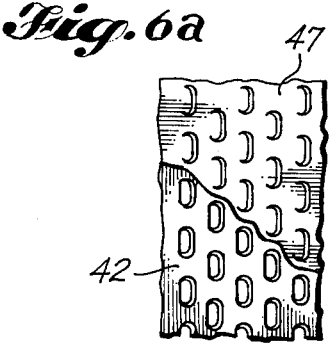
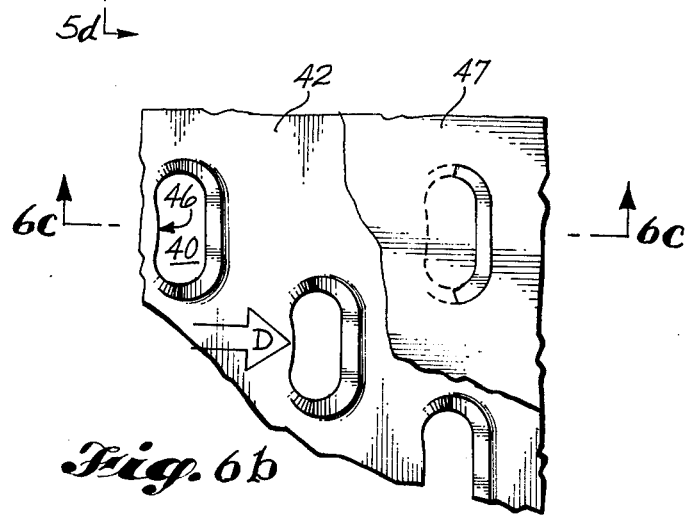
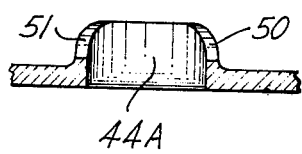

ANTI-FRICTION COMPOSITE WITH METAL BACKING OF RIGID PRONGS AND LUBRICANT OVERLAY

BACKGROUND OF THE INVENTION

This invention relates generally to improvements in anti-friction composites and in one aspect relates to anti-friction composites in the form of replaceable pressure shoes positionable on stationary platens of continuous presses used in the manufacture of consolidated board-like products such as fiberboard. Composites comprised of layers of solid lubricants such as polytetrafluoroethylenes bonded to metal backing members have long been used to reduce sliding friction between machinery components. For example, in Malarkey, U.S. Pat. No. 3,215,065, there is disclosed a continuous press apparatus useful for the manufacture of laminated beams and the like. The apparatus includes a pair of opposed, traveling belt runs (in the form of continuous metal bands) for moving material therethrough and stationary platens or pressure application members for urging the belt runs together. To facilitate sliding of the belts across the platens, each platen includes a low-coefficient-of-friction surfacing means comprising a series of plastic-coated shoes set end-to-end. The illustrated shoes are comprised of a backing plate and a tetrafluoroethylene sheet bonded thereto. Malarkey U.S. Pat. No. 2,918,307 and Knapp U.S. Pat. No. 3,215,065 disclose other continuous presses incorporating anti-friction surfacing means on stationary platens.

It is an object of this invention to provide anti-friction composites useful, for example, as pressure shoes (or "wear pads") in continuous presses of the type just discussed and in other applications, which composites have high load-bearing capabilities, are capable of withstanding high temperatures, exhibit good heat transfer characteristics, are so constructed that they maintain their physical shape and integrity despite any tendency of the anti-friction surfacing material to undergo plastic flow under prolonged application of heat and stress.

SUMMARY OF THE INVENTION

In one of its aspects, this invention is directed to a heat-transmitting, anit-friction composite comprising a metal backing member overlaid with a low-coefficient-of-friction sheet comprised of a solid lubricant, such as polytetrofluoroethylene (hereinafter abbreviated "PTFE"). The backing sheet carries thereon a multiplicity of rigid metal prongs projecting transversely from one of its faces. The overlay sheet is impaled on the prongs, and is preferably adhesively bonded to the backing member. The prongs extend through the overlay sheet and have their tips substantially coincident with the face of the overlay sheet remote from the backing member. The prongs serve to resist plastic flow of the overlay sheet when it is subject to stresses parallel to the plane of the sheet, and also serve as paths for efficiently conducting heat through the overlay sheet. Still further, the prongs serve to mechanically connect the overlay to the backing member. Preferably, the backing member is a thin brass or bronze plate that has been perforated to form the prongs carried thereon.

The composites of this invention are especially useful as pressure shoes functioning as surfacing members for heated platens of continuous presses of the type including continuous, traveling belts that slide across the platens. Other aspects and exemplary embodiments of this invention are described hereinafter.

BRIEF DESCRIPTION OF THE DRAWINGS

The foregoing and further objects and various advantages of the present invention will become apparent to those skilled in the art from the following detailed description and appended drawings, wherein:

FIGS. 5a and 6a are plan views of portions of the alternative embodiments of the pressure shoes of this invention with portions of the anti-friction surfacing layer removed to expose the underlying structure.

FIGS. 5b and 6b are enlarged views of portions of FIGS. 5a and 6a, respectively.

FIGS. 5c and 6c are sectional views taken along lines 5c—5c and 6c—6c of FIGS. 5b and 6b, respectively.

FIGS. 5d and 6d are sectional views taken along lines 5d—5d and 6d—6d of FIGS. 5c and 6c, respectively.

DETAILED DESCRIPTION OF THE DRAWINGS AND THE PREFERRED EMBODIMENTS

Figure 1:
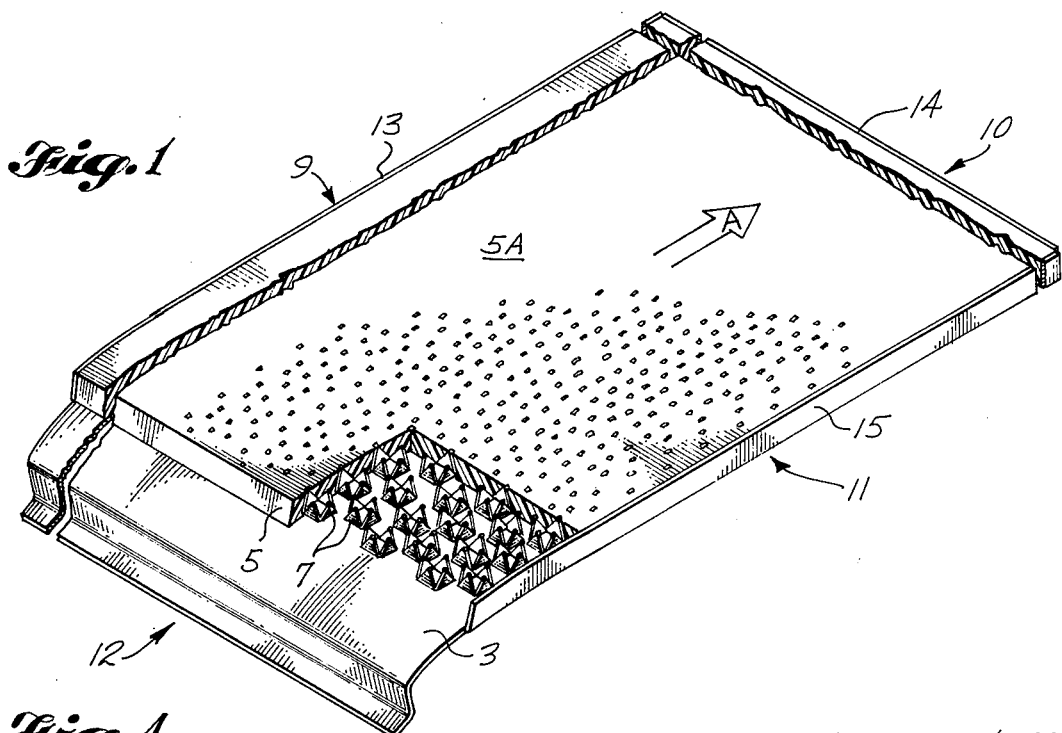
FIG. 1 is a partially fragmented isometric view of an anti-friction pressure shoe of this invention.
Figure 2:
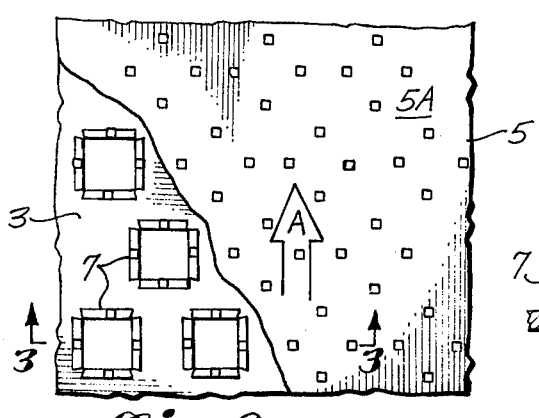
FIG. 2 is a plan view of an area of the pressure shoe of FIG. 1 with a portion of the anti-friction surfacing layer removed to expose the underlying structure.
Figure 3:
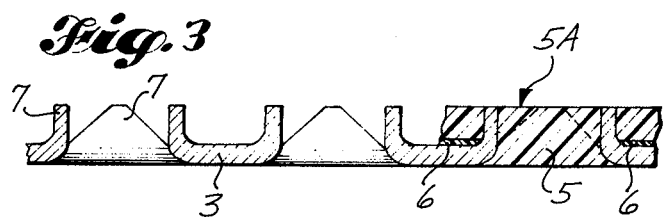
FIG. 3 is a sectional view taken along line 3—3 of FIG. 2.

Referring to FIGS. 1–3 of the drawings, the pressure shoe there shown is a composite of a metal backing sheet 3 and an overlay sheet 5 comprised of a solid lubricant such as PTFE. The backing sheet 3 carries rigidly thereon a multiplicity of rigid, triangularly shaped prongs 7 extending substantially at right angles from the upper face of the backing sheet, the prongs having been formed by upsetting segments of the backing sheet as hereinafter described. The prongs are preferably distributed substantially uniformly over the sheet. An overlay sheet 5 is impaled on the prongs, and is seated against and bonded to the upper face of the backing sheet by a layer of adhesive. It will be noted that the prongs extend through the entire thickness of the overlay and have their pointed tips flush with the outer surface 5A of the overlay, which surface forms the bearing surface of the shoe. The prongs, being made of metal, provide paths for efficiently transmitting heat through the overlay sheet which typically will have a relatively low thermal conductivity.

The backing sheet is generally rectangular in shape and is similarly flanged along three sides 9–11 to form projections 13–15 extending upwardly from the backing sheet to the outer surface 5A of the overlay sheet. The purpose of the flanges is to minimize plastic flow of the overlay sheet along the "downstream" side 10 of the shoe and the sides 9, 11 adjacent thereto. The fourth or "upstream" side 12 of the backing sheet is flanged oppositely to the other sides to provide an L-shaped projection 16 extending downwardly out of the plane of the backing sheet so as to be engageable with a holder in the platen of a press as shown in FIG. 4 to which reference is now made.

Figure 4:
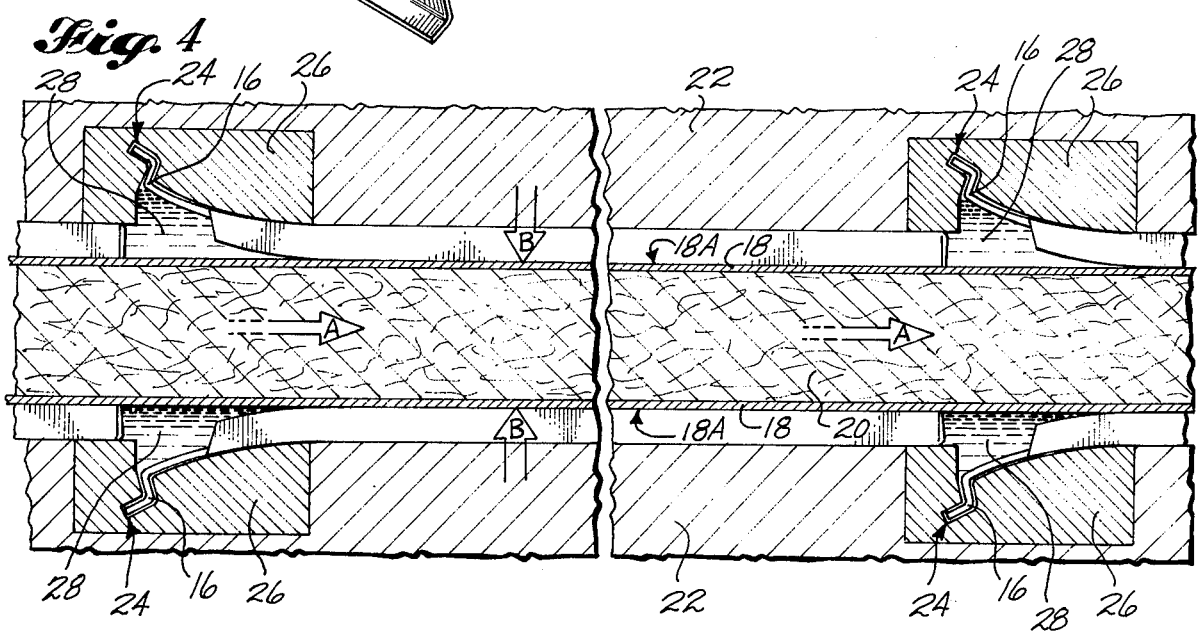
FIG. 4 is a vertical sectional view of platens and belt runs of a continuous press of this invention embodying pressure shoes of FIG. 1.

The continuous press depicted in FIG. 4 includes a pair of opposing metal belts 18 between which a workpiece 20 (such as a fiberboard mat) is heated, compressed, and transported through the press in the direction indicated by arrows "A". (Although not shown in the drawings, each belt 18 is a continuous, closed loop.) Heat and pressure are applied to the belts (in the directions of arrows "B") by stationary platens 22 which include pressure shoes of FIGS. 1-3. (By "stationary platens" is meant platens that do not travel in a direction parallel to the workpiece.) In continous presses of the type shown in FIG. 4, the spacing between the platens, and consequently the spacing between the opposing belt runs, progressively decreases as the workpiece is transmitted through the press resulting in progressive compression of the workpiece.

The outer surfaces 5A of the overlay sheets in the pressure shoes constitutes a bearing surface over which one of the belts slides. The width and length of individual shoes are only fractions of those of the platens so that damage to a small area of the total bearing surface of a platen can be rectified by replacement of one or several small shoes that define the damaged area.

The L-shaped projections 16 along the upstream sides of the pressure shoes are engaged in slots 24 extending across the platens, these slots being defined by holders 26 referred to as "retaining bars" disposed in the surfaces of the platens facing the belts. Successive rows of pressure shoes are spaced apart so that gaps are defined therebetween. These gaps, which extend the full width of the platens, are filled with a high-temperature synthetic liquid lubricant 28. The lubricant is contacted and picked up by the outside surfaces 18A of the belts 18 and carried between the belts and the pressure shoes. The liquid lubricant not only enhances lubrication between the belts and shoes but also helps to carry away particulate matter that may be introduced therebetween. The liquid lubricant is periodically or continuously withdrawn, filtered to remove particulate matter and recycled to the press.

It is known that most solid lubricants have a tendency to creep and flow when subjected to stress forces at elevated temperatures. Attempts have been made to reduce this tendency by incorporating various fibers, filaments and particulate fillers into the solid lubricant. However, at the elevated temperatures typically employed in fiberboard presses (e.g., 250° - 400° F.), even such filled solid lubricants flow to an unacceptable extent when subjected to intense shear forces. In the composite of this invention, the prongs act as dams that retard plastic flow of the solid lubricant if it has the mentioned tendency. As best seen in FIG. 2, the positions of groups of prongs in successive rows are staggered so that groups in alternate rows are offset laterally from groups in the adjacent rows thereby to provide the damming effect across substantially the full width of the shoe. As apparent from FIG. 2, each portion of the overlay sheet surrounded by a group of prongs remains connected to the body of the sheet thus maintaining the integrity of the overlay as a whole.

Since the tips of the prongs are at or very near the bearing surface of the composite, the prongs should be composed of a relatively soft metal so that they do not unduly increase the coefficient of friction at that surface. The prongs however should be rigid enough to withstand the impaling operation. It is preferred to employ a brass or bronze (the former being especially preferred) because in sheet form these metals are relatively soft, and therefore can be readily stamped and perforated, and have non-galling characteristics.

The presently preferred material for use as the overlay sheets in the composites of this invention is a specially compounded form of PTFE sold by Dixon Corporation under the trademark "Rulon A" which is reported to be produced according to U.S. Pat. No. 3,122,505. Other useful sheet materials include "Multifil" 426 tape, a blend of PTFE and fillers available from the Bearings Division of Garlock Inc.; "Turcite" B, a blend of PTFE and minute brass particles available from W. S. Shamban & Co.; and "Fluorgold", a reinforced PTFE available from the Fluorocarbon Company.

The presently preferred adhesive for bonding the overlay sheet to the backing sheet is "Plastilock 655" adhesive film available from B. F. Goodrich of Akron, Ohio. This film is reported to be a nitrile rubber-phenolic resin compound. Other industrial adhesives of the epoxy or rubber-base type may also be used.

In the presently preferred method of manufacturing the pressure shoes shown in FIGS. 1-3, a sheet of 22-gauge, halfhard cartridge brass cut to size is die-stamped to form the edge detail along the downstream side and two longitudinal sides. Holes are then punched in the sheet to upset groups of generally triangularly-shaped prongs. Perforation of the sheet is accomplished using a male die member having a shaft of rectangular cross section and a pyramid-shaped tip and a female die member having a square cross section slightly larger than that of the male member. As punched, the tips of the prongs are more pointed than shown in FIGS. 1-3. The slight flattening of the tips evident in FIGS. 1-3 occurs when the bearing surface of the composite is ground off as subsequently explained.

After the backing sheet has been perforated, its upper surface is prepared for bonding to the adhesive by degreasing with trichloroethylene, sandblasting lightly and oven-oxidizing for the time and at the temperature recommended by the manufacturer of the adhesive being used. Sheets of adhesive film and solid lubricant cut to proper size are then laid over the prongs and the backing member, adhesive film and overlay sheet are pressed together at room temperature until the thickness of the resulting composite equals the sum of the three components. Pressures of from 7,000 to 10,000 psi are typically used during this step. During this pressing step the adhesive film and lubricant sheet become impaled on the prongs. Not infrequently, some or all the prongs hook over slightly to augment the mechanical bond between the components of the composite. If the length of the prongs is initially greater than the thickness of the overlay, the degree of mechanical bonding is increased. The composite is then hot pressed (with a heat-resistant pad over the overlay sheet) at the pressure and temperature and for the cure time recommended by the adhesive manufacturer.

If the original height of the prongs is equal to or less than the combined thickness of the overlay and adhesive, there will be little if any brass exposed at the bearing surface after the hot pressing step. If the composite is to be used in an application where good thermal conductivity is desired, the bearing surface of the composite may be ground off to remove a thin layer of lubricant and thereby increase the area of exposed brass. To an extent, increasing the area of brass exposed results in a proportionate increase in the thermal conductivity of the composite. In applications where good thermal conductivity is unnecessary, the tips of the prongs need only be sufficiently close to the bearing surface to retard flow of the solid lubricant. After the hot pressing step and the grinding step, if any, the upstream side of the shoe is die stamped to form the L-shaped projection.

Referring now to the FIGS. 5a–d and 6a–d, there are shown two other composites according to the present invention similar to that of FIGS. 1–3 but having differently shaped prongs. The prongs 30 in the composite of FIGS. 5a–d are formed by perforating the backing sheet 31 so as to upset an area 32 that has first and second straight, opposing parallel sides 33, 34 of substantially equal length, a third side 35 perpendicular to and approximately twice the length of the first two and a fourth, crescent-shaped side 36 that is convex relative to the third side 35. The prong remains connected to the backing sheet along the crescent-shaped side. The corners between each of the first and second sides and the third side are rounded. The resulting prongs extend perpendicularly from the backing sheet with their faces 30A and 30B generally perpendicular to the direction (indicated by Arrow C) in which the overlay 37 will tend to flow during use of the composite. When viewed normal to the plane of the backing sheet, as in FIG. 5b, the prongs are crescent-shaped; and when viewed normal to their faces as in FIG. 5d, are generally rectangular in shape.

In the composite of FIGS. 6a–d the areas 40 upset from the backing sheet 42 to form the prongs 44 are in the shape of enlongated, round-ended rectangles. Each upset segment is severed from the backing sheet only along one long side 46 of the rectangular area. The prong faces 44A and 44B extend perpendicular to the direction (indicated by Arrow D) in which the overlay 47 will tend to flow during use of the composite. The resulting prongs are three sided with one side 48 extending perpendicular to the direction of Arrow D and second and third shorter sides 50 and 51 generally perpendicular to the first. As best seen in FIG. 6d, the top edge 48A of the long side is straight and generally parallel to the plane of the backing sheet while the shorter sides taper from the height of the long side to the upper face of the backing sheet. The short sides of the prong serve to brace the long side and reduce its tendency to bend or curl during impaling of the overlay sheet.

Where composites shown in drawings have been produced from 0.025 in. brass sheets and 1/16 in. thick overlay sheets, spacings between the centers of adjacent perforations have been from about 3/16 to 5/16 in.

What is claimed is:

1. A heat-transmitting, anti-friction composite comprising a metal backing member carrying rigidly thereon a multiplicity of rigid prongs projecting transversely from a face thereof, an overlay sheet comprised of a solid lubricant, said overlay sheet being impaled on said prongs, the tips of said prongs being substantially coincident with the face of said overlay sheet remote from said backing member.

2. The composite of claim 1 wherein said solid lubricant is a polytetrafluoroethylene.

3. The composite of claim 2 wherein said metal is brass.

4. The composite of claim 1 wherein said metal is brass.

5. The composite of claim 1 wherein said overlay sheet is adhesively bonded to said backing sheet.

6. The composite of claim 1 wherein said prongs are tapered from relatively wide bases at said face to narrow tips.

7. The composite of claim 1 wherein said overlay sheet is of a type tending to undergo plastic flow when subjected to stress at elevated temperatures.

8. The composite of claim 1 wherein said backing member is a metal sheet and said prongs consist of segments punched from said metal sheet.

9. The composite of claim 8 wherein said prongs are tapered from relatively wide bases at said face to narrower tips.

10. The composite of claim 9 wherein said prongs are generally triangular in shape.

11. The composite of claim 8 wherein the prongs are arranged in groups with each group distributed about the area of the metal sheet from which the group was punched.

12. The composite of claim 11 wherein said prongs are generally triangular in shape.

13. The composite of claim 11 wherein each of said groups consists of four generally triangular prongs surrounding and having upstanding sides facing the area of said metal sheet from which the group was punched.

14. The composite of claim 8 wherein the metal sheet is of generally rectangular proportions with three edges thereof similarly flanged transversely to the sheet to form projections not materially less in height than the thickness of the overlay sheet and with a fourth edge oppositely flanged to permit engagement with an external holder offset from the plane of the sheet.

15. In a continuous press for the manufacture of consolidated board-like products comprising a movable, heattransmitting belt adapted to transport workpieces through the press and providing a pressure surface for applying heat and pressure to workpieces, heat and pressure application means for transmitting heat to said belt and urging the belt against workpieces, said heat and pressure application means including low-coefficient-of-friction surfacing means defining a bearing surface over which said belt slides and at which heat and pressure are transmitted to said belt, the improvement wherein said surfacing means comprises a composite comprised of a metal backing member carrying rigidly thereon a multiplicity of rigid prongs projecting transversely from a face thereof, an overlay sheet comprised of a solid lubricant, said overlay sheet being impaled on said prongs, the tips of said prongs being substantially coincident with the face of said overlay sheet remote from said backing sheet.

16. The press of claim 15 wherein said solid lubricant is polytetrafluroethylene.

17. The press of claim 16 wherein said metal is brass.

18. The press of claim 15 wherein said metal is brass.

19. The press of claim 16 wherein said overlay sheet is adhesively bonded to said backing member.

20. The press of claim 15 wherein said prongs are tapered from relatively wide bases at said face to narrower tips.

21. The press of claim 20 wherein said prongs are generally triangular in shape.

22. The press of claim 15 wherein said overlay sheet is of a type tending to undergo plastic flow when subjected to stress at elevated temperatures.

23. The press of claim 15 wherein said backing member is a metal sheet and said prongs consist of segments punched from said metal sheet.

24. The press of claim 23 wherein said prongs are tapered from relatively wide bases at said face to narrower tips.

25. The press of claim 24 wherein said prongs are generally triangular in shape.

26. The press of claim 23 wherein the prongs are arranged in groups with each group distributed about the area of the metal sheet from which the group was punched.

27. The press of claim 26 wherein the said prongs are generally triangular in shape.

28. The press of claim 26 wherein each of said groups consists of four triangular shaped prongs surrounding and having upstanding sides facing the area of the metal sheet from which the group was punched.

29. The press of claim 15 wherein the surfacing means is of generally rectangular proportions with three edges of said backing member similarly flanged transversely to the backing member to form projections not materially less in height than the thickness of the overlay sheet and with a fourth edge oppositely flanged to permit engagement with an external holder offset from said bearing surface.

30. A heat-transmitting, anti-friction composite comprising a metal backing member carrying rigidly thereon a multiplicity of rigid prongs projecting transversely from a face thereof, and an overlay sheet comprised of a solid lubricant, said overlay sheet surrounding said prongs and being in intimate contact with said prongs and said face of said metal backing member, the tips of said prongs being substantially coincident with the face of said overlay sheet remote from said backing member.

* * * * *